US012390850B2

(12) United States Patent
Boldrini

(10) Patent No.: US 12,390,850 B2
(45) Date of Patent: Aug. 19, 2025

(54) METHOD AND MACHINE TO MANUFACTURE ONE OR MORE COILS AROUND RESPECTIVE ARTICLES

(71) Applicant: G. D SOCIETA' PER AZIONI, Bologna (IT)

(72) Inventor: Fulvio Boldrini, Bologna (IT)

(73) Assignee: G.D SOCIETA' PER AZIONI, Bologna (IT)

(*) Notice: Subject to any disclaimer, the term of this patent is extended or adjusted under 35 U.S.C. 154(b) by 254 days.

(21) Appl. No.: 18/053,339

(22) Filed: Nov. 7, 2022

(65) Prior Publication Data

US 2023/0150011 A1 May 18, 2023

(30) Foreign Application Priority Data

Nov. 15, 2021 (IT) ........................ 102021000028892

(51) Int. Cl.
*B21F 3/00* (2006.01)
*H01F 41/09* (2016.01)

(52) U.S. Cl.
CPC ................ *B21F 3/00* (2013.01); *H01F 41/09* (2016.01)

(58) Field of Classification Search
CPC ...... H01F 41/09; H01F 41/096; H01F 41/098; H01F 41/06; H01F 41/071; H01F 41/076;
(Continued)

(56) References Cited

U.S. PATENT DOCUMENTS 3,691,606 A 9/1972 Muskulus
4,713,883 A * 12/1987 Santandrea ............ H02K 15/00 29/736

(Continued)

FOREIGN PATENT DOCUMENTS

CH 681936 A5 * 6/1993 ............ H02K 15/00
CN 106463258 A * 2/2017 ............ H01F 19/00

(Continued)

OTHER PUBLICATIONS

Italian Search Report and Opinion for Italian Patent Application 102021000028892 date Jun. 13, 2022.

*Primary Examiner* — Anna M Momper
*Assistant Examiner* — Henrix Soto
(74) *Attorney, Agent, or Firm* — MARSHALL, GERSTEIN & BORUN LLP

(57) ABSTRACT

A method and an automatic machine to manufacture one or more coils around respective articles. The following steps are provided: moving, by means of a main conveyor and along a processing path, a plurality of carriages, each provided with at least one seat designed to house an article; placing, in an input station arranged along the processing path, each article in the seat of a corresponding carriage; coupling, in at least one of two winding stations arranged one after the other along the path, a wire around an article carried by a carriage to create a corresponding coil; using, when they are both working, the two winding stations together and in parallel, having each winding station operate at a first production speed; and using, when a winding station is not working, only the other winding station, operates at a second production speed, higher than the first production speed.

17 Claims, 10 Drawing Sheets

(58) Field of Classification Search
CPC ... H01F 41/04; B21F 3/00; B21F 3/02; H02K 15/00
USPC ........................................................ 242/437.3
See application file for complete search history.

(56) References Cited

U.S. PATENT DOCUMENTS

| | | | | | |
|---|---|---|---|---|---|
| 4,817,888 | A | | 4/1989 | Arnold | |
| 4,901,773 | A | * | 2/1990 | Marshall | H01F 41/096 29/605 |
| 5,680,696 | A | * | 10/1997 | Bonura | H02K 15/00 198/346.2 |
| 6,305,277 | B1 | * | 10/2001 | Witczak | B65B 27/06 100/2 |
| 7,314,195 | B2 | * | 1/2008 | Takeda | H01F 41/082 242/445.1 |
| 10,755,858 | B2 | * | 8/2020 | Yamaguchi | H01G 2/065 |
| 2008/0007378 | A1 | * | 1/2008 | Hanser | H01F 41/09 29/605 |

FOREIGN PATENT DOCUMENTS

| | | | | | |
|---|---|---|---|---|---|
| CN | 208061856 | U | * | 11/2018 | H01F 41/064 |
| CN | 111696781 | A | * | 9/2020 | |
| EP | 0264578 | A1 | * | 4/1988 | |
| GB | 1590920 | A | | 6/1981 | |

* cited by examiner

METHOD AND MACHINE TO MANUFACTURE ONE OR MORE COILS AROUND RESPECTIVE ARTICLES

CROSS-REFERENCE TO RELATED APPLICATIONS

This patent application claims priority from Italian patent application no. 102021000028892 filed on Nov. 15, 2021, the entire disclosure of which is incorporated herein by reference.

FIELD OF THE DISCLOSURE

The invention relates to a method and a machine to manufacture one or more coils around respective articles.

The invention is advantageously applied in the tobacco industry in order to assemble a transponder in a component of a disposable cartridge of an electronic cigarette, to which explicit reference will be made in the description below without because of this losing in generality.

BACKGROUND

An electronic cigarette normally comprises a re-usable part, which is used several times and contains, among other things, an electric battery (which provides the power needed for the operation of the electronic cigarette) and an electronic processor, which controls the operation of the electronic cigarette. Furthermore, the electronic cigarette comprises a disposable cartridge (namely to be used one single time and to be then replaced), which is coupled to the re-usable part.

Recently, a disposable cartridge was developed, which is provided with a transponder equipped with a memory where the features of the disposable cartridge are stored, in particular the features of the (liquid or solid) active substance that is heated in order to release the vapors to be inhaled; in this way, the re-usable part of the electronic cigarette can read the features of the disposable cartridge coupled thereto, accordingly adjusting the heating to the features of the disposable cartridge.

In most applications, the transponder comprises one single wound antenna (namely, one single coil serving as antenna); however, in some applications, the transponder can comprise a plurality of wound antennas (namely, a plurality of coils serving as antennas), which have different spatial orientations so as to make sure that the transponder is capable of effectively communicating in all possible positions.

A significant problem arising when manufacturing a wound antenna (namely, a coil serving as antenna) for a transponder lies in the need to use a very thin wire (having a diameter in the range of 50-200 microns), hence having an extremely small mechanical resistance (the tensile strength amounts to a few Newtons): if, during the winding of the wire, there accidentally is an even small increase in traction (2-3 excess Newtons are enough), the wire risks breaking, thus consequently leading to a standstill of the automatic machine until the intervention of a skilled operator (who, anyway, needs several minutes to restore the continuity of the wire). Every standstill of the automatic machine obviously reduces the daily productivity of the automatic machine to a significant extent and, at the same time, increases direct costs for the management of the automatic machine, as a consequence of the costs arising from the intervention of the skilled operator.

Patent application GB1590920A discloses a method to manufacture one single coil around an article, comprising the steps of: moving, by means of a main conveyor and along a processing path, a plurality of carriages, each provided with at least one seat designed to house an article; placing, in an input station arranged along the processing path, each article in the seat of a corresponding carriage; and coupling, in a first winding station or, alternatively, in a second winding station arranged one after the other along the path, a wire around an article carried by a carriage so as to create a corresponding coil.

DESCRIPTION OF THE INVENTION

The object of the invention is to provide a method and a machine to manufacture one or more coils around respective articles, said method and said machine allowing a high productivity (measured as number of articles produced per time unit) to be reached and maintained, even in the long run.

According to the invention there are provided a method and a machine to manufacture one or more coils around respective articles as claimed in the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein.

Preferred Embodiments of the Invention

Figure 1:
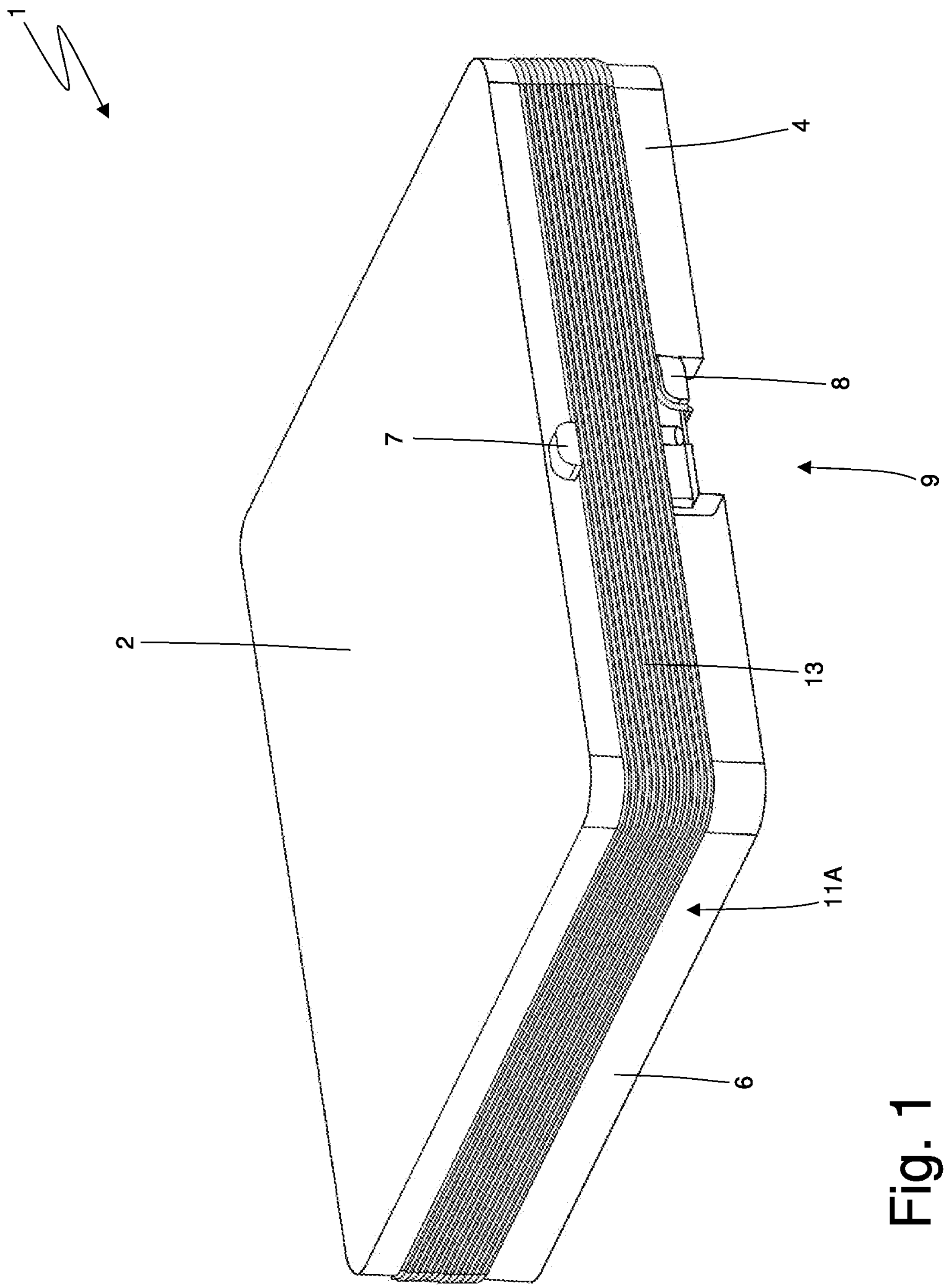
FIGS. 1 and 2 are two different perspective views of a component of a disposable cartridge of an electronic cigarette.
Figure 2:
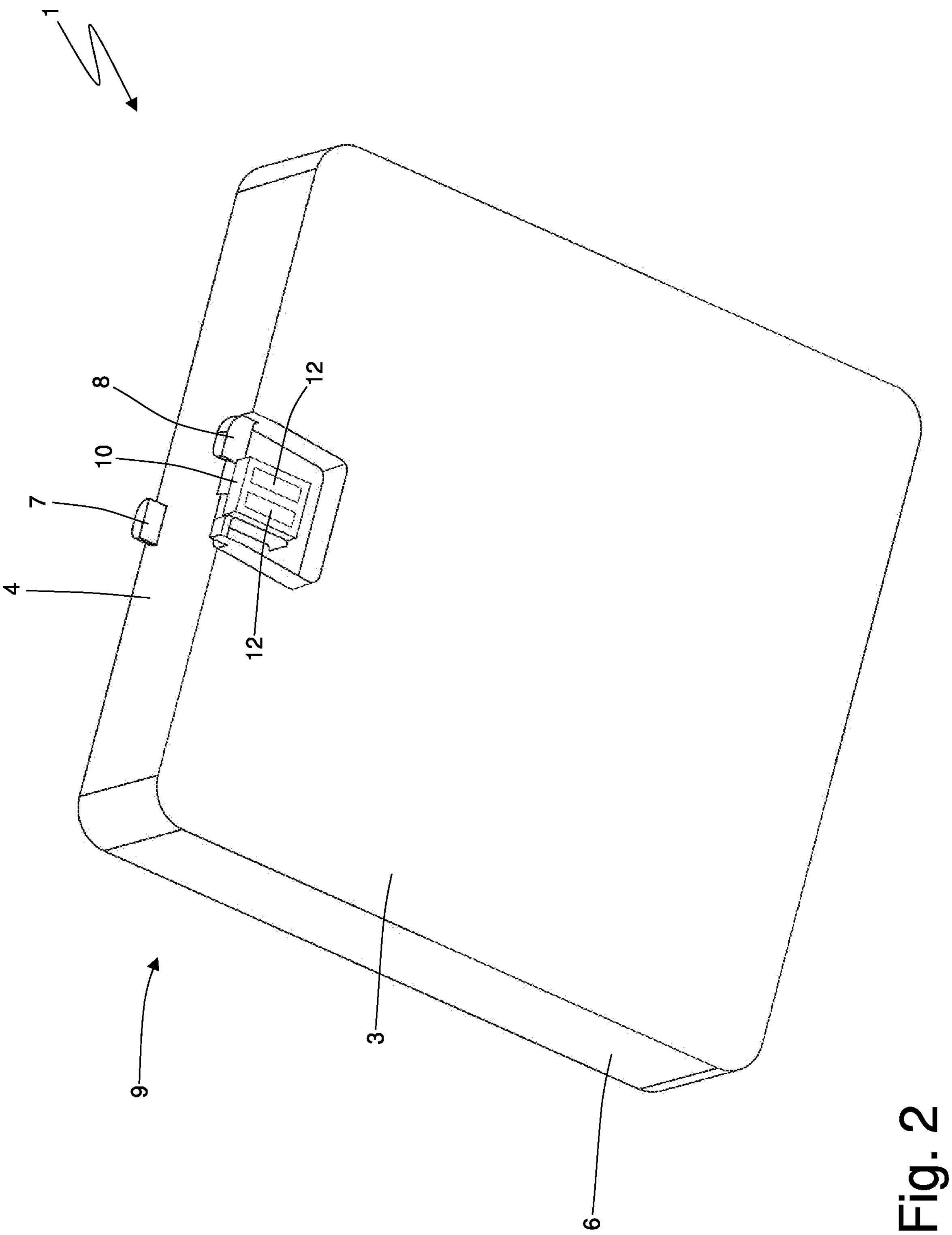

In FIGS. 1 and 2, reference number 1 indicates, as a whole, an article making up a component of a disposable cartridge of an electronic cigarette.

The article 1 approximately has the shape of a parallelepiped having six walls (faces): an upper wall 2, a lower wall 3 parallel to and opposite the upper wall 2, a front wall 4, a rear wall 5 parallel to and opposite the front wall 4 and two side walls 6 parallel to and opposite one another.

The articles 1 comprises two pins 7 and 8 (namely, two small columns), which project (namely, in a perpendicular manner) from the front wall 4.

The article 1 comprises a transponder 9, namely an electronic device (of the passive kind, namely without a power supply of its own), which is capable of storing information and is capable of communicating through radio frequency. In other words, the transponder 9 is a small-sized smart label, which is designed to reply to the interrogation made from a distance by suitable fixed or portable apparatuses, known as readers (or interrogator devices); a reader is capable of reading and/or changing the information contained in the transponder 9 being interrogated by communicating with the transponder 9 through radio frequency. As a consequence, the transponder 9 is part of a wireless reading and/or writing system operating according to the so-called RFID ("Radio-Frequency Identification") technology.

The transponder 9 comprises an integrated electronic circuit 10 (namely, a microchip) provided with a non-volatile memory (typically, an EEPROM or a FRAM) and a coil 11A, which is connected to the electronic circuit 10; in particular, the electronic circuit 10 has two electrical contacts 12, to which two ends of the coil 11A are welded. The coil 11A is wound and consists of a plurality of turns of an externally insulated conductor wire 13; in the embodiment shown in the accompanying figures there are approximately 10-15 turns. The conductor wire 13 is wound around the walls 4, 5 and 6 of the article 1, whereas the electronic circuit 10 is arranged in a housing obtained in the lower wall 3 of the article 1. According to a preferred embodiment, the conductor wire 13 has a diameter ranging from 10 to 500 microns and preferably ranging from 20 to 200 microns (even though, in most applications, the diameter ranges from 25 to 150 microns).

The electronic circuit 10 uses the coil 11A to communicate, through radio frequency, with other electronic devices located nearby. Alternatively or in addition, the electronic circuit 10 could also use the coil 11A to generate power (used for its own operation and/or to charge its own electric battery) exploiting an electromagnetic field generated by an electronic device located nearby; namely, the electronic circuit 10 could also use the coil to carry out an inductive (namely contact-less) power charging of its own electric battery. As a consequence, the coil 11A constitutes an antenna, which can be used to exchange (transmit) information by means of electromagnetic waves (in this case, the antenna is part of a telecommunication device) and/or can be used to exchange power by means of electromagnetic waves (in this case, the antenna is part of a charging device). Namely, the coil 11A constitutes a wound antenna for electromagnetic interactions, which can be aimed at exchanging (transmitting) information or can be aimed at generating electrical power through electromagnetic induction.

Figure 3:
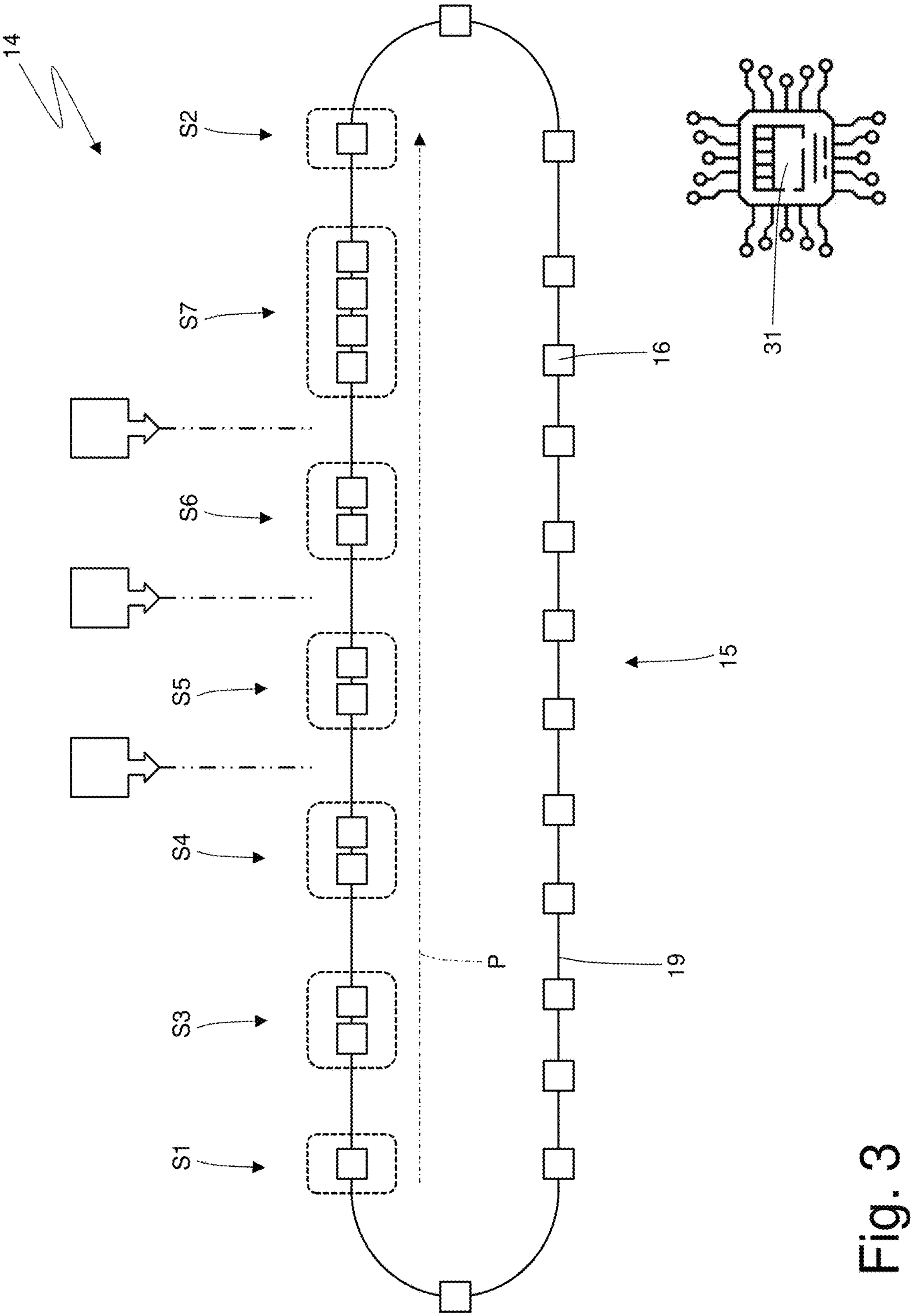
FIG. 3 is a schematic front view of a machine producing the component of FIGS. 1 and 2 and manufactured according to the invention.
Figure 4:
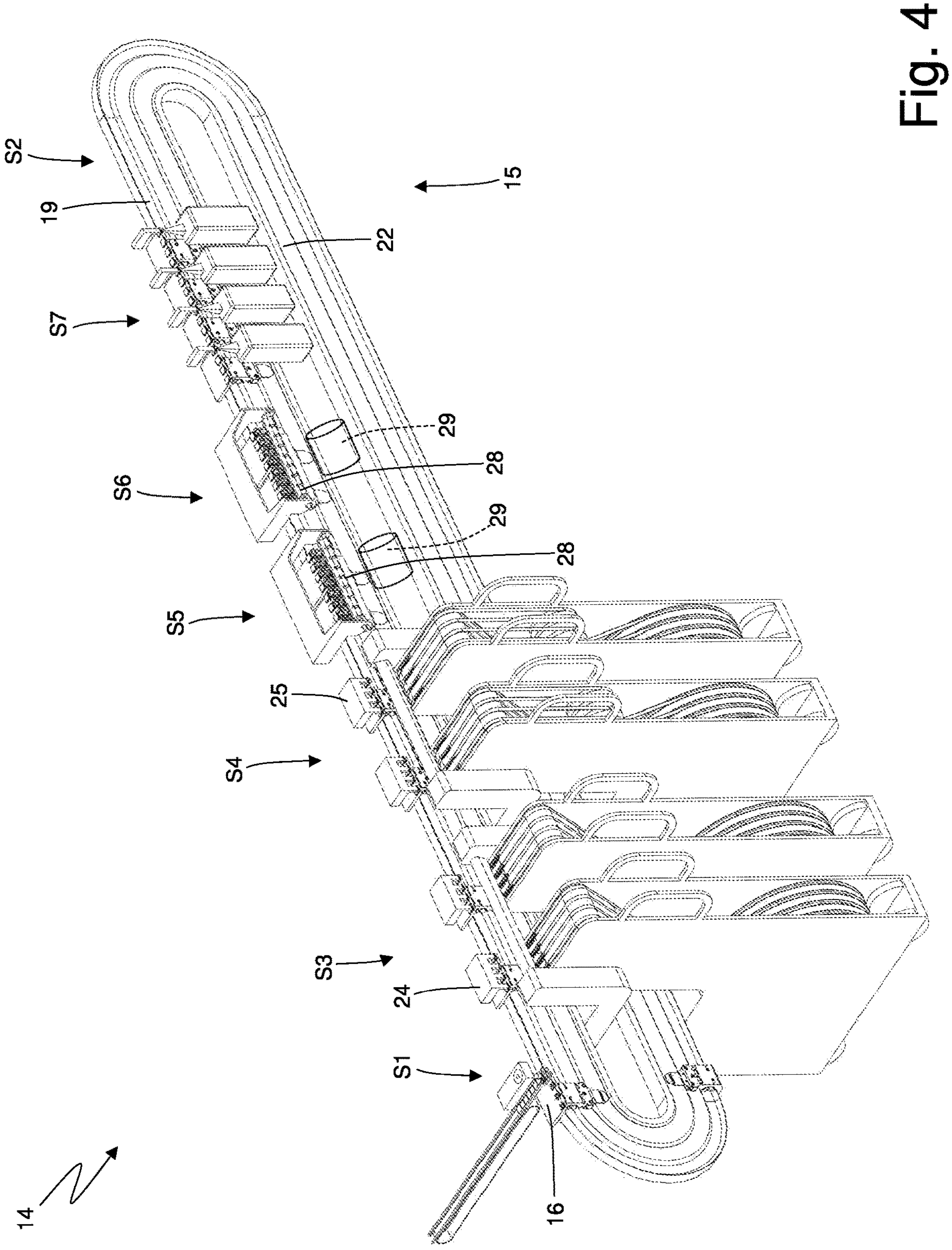
FIG. 4 is a perspective view, with parts removed for greater clarity, of the machine of FIG. 3.

In FIGS. 3 and 4, reference number 14 indicates, as a whole, an automatic machine to assemble the article 1.

The automatic machine 14 comprises a support body (namely, a frame), which rests on the ground by means of legs and has, at the front, a vertical wall on which the operating members are mounted. Furthermore, the automatic machine 14 comprises a main conveyor 15, which moves the articles 1 being processed along an assembling path P, which extends between an input station S1 (where the main conveyor 15 receives the articles 1 to be completed, namely assembled) and an output station S2 (where the main conveyor 15 releases complete, namely assembled articles 1); in particular, the assembling path P is horizontal and linear, namely substantially extends along a straight line arranged horizontally.

The assembling path P goes through a series of stations S3-S7 (better described below), where the articles 1 passing by are subjected to assembling operations.

Figure 5:
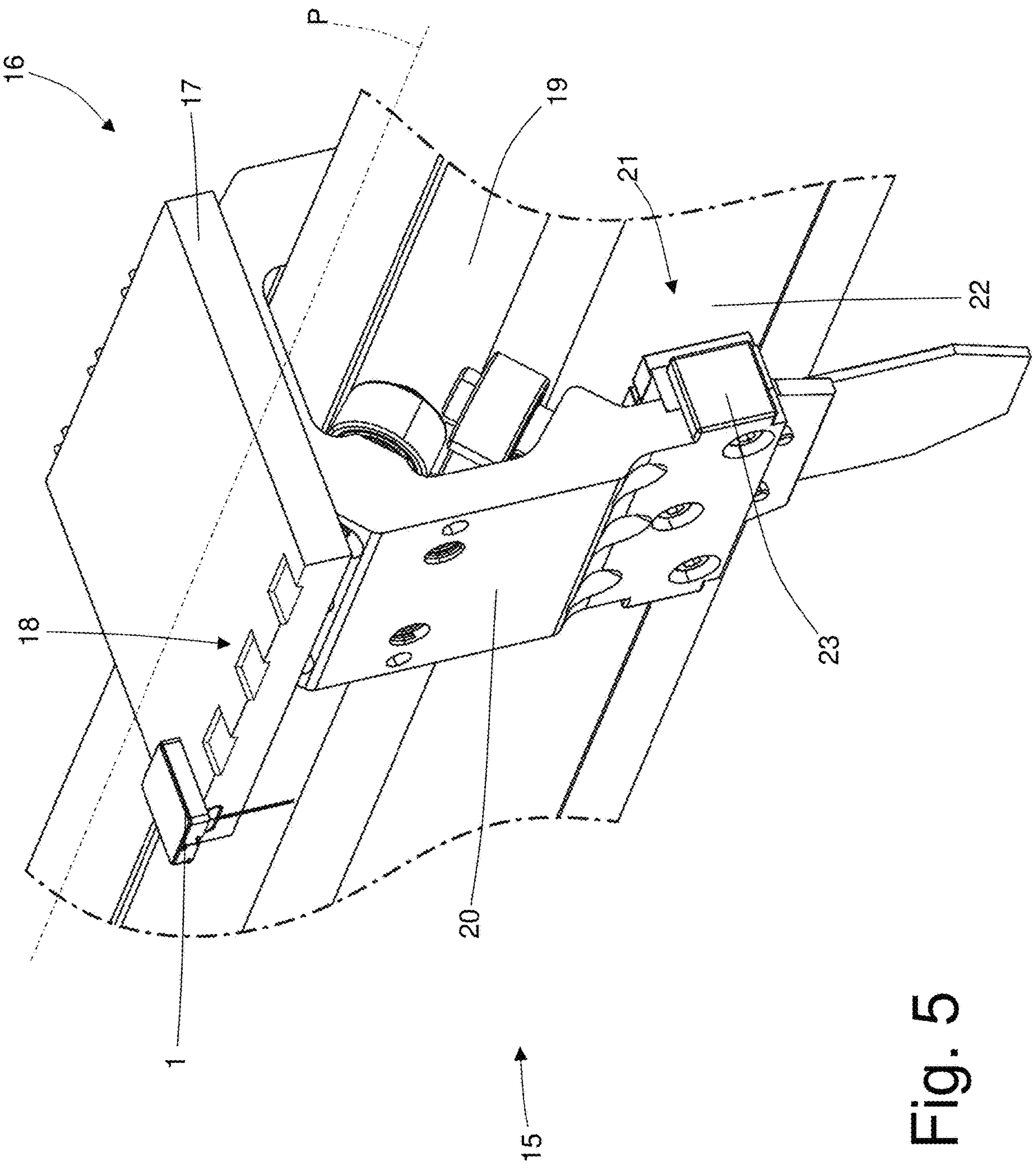
FIG. 5 is a perspective view of a carriage of a main conveyor of the machine of FIG. 3.

The main conveyor 15 comprises a plurality of carriages 16, which are moved along the assembling path P; as better shown in FIG. 5, each carriage 16 comprises a support plate 17, where four seats 18 are obtained, each designed to receive and house a corresponding article 1 (namely, each seat 18 reproduces in negative the shape of the article 1 so as to accommodate the article 1 without a significant clearance). The number of seats 18 obtained in the support plate 17 of a carriage 16 could obviously be different from four (it generally ranges from a minimum of one to a maximum to seven-eight seats 18).

According to FIG. 5, the main conveyor 15 is normally designed to cyclically move each carriage 16 along the building path P with an intermittent (step-like) movement, which entails cyclically alternating movement phases, in which the main conveyor 15 moves the carriages 16, and stop phases, in which the main conveyor 15 holds the carriages 16 still. The main conveyor 15 comprises an annular guide 19 (namely, closed on itself with a ring shape), which is arranged in a fixed position along the building path P; in particular, the annular guide 19 consists of one single fixed track (namely, without movement), which is arranged along the building path P. Furthermore, the main conveyor 15 comprises a plurality of slides 20, each supporting a corresponding carriage 16 and being coupled to the guide 19 so as to freely slide along the guide 19. Finally, the main conveyor 15 comprises a linear electric motor 21, which moves the slides 20 carrying the carriages 16 along the building path P; the linear electric motor 16 comprises an annular stator 22 (namely, a fixed primary element), which is arranged in a fixed position along the guide 19, and a plurality of movable sliders 23 (namely, movable secondary elements), each electrically-magnetically coupled to the stator 22 so as to receive, from the stator 22, a driving force and rigidly connected to a corresponding slide 20.

According to a different embodiment, which is not shown herein, the main conveyor 15 is a conveyor belt and comprises (at least) a flexible belt, which supports the carriages 16 and is closed in a ring shape around at least two end pulleys (at least one of them being motor-driven).

According to FIGS. 3 and 4, at the beginning of the assembling cycle, the main conveyor 15 moves a carriage 16 (carrying four seats 18) along the assembling path P so as to stop one single carriage 16 in the input station S1, where four articles 1 (to be assembled, namely completed) are placed in the corresponding four seats of the carriage 16.

Subsequently, the main conveyor 15 moves a carriage 16 (carrying four seats 18) along the assembling path P and from the input station S1 to the application station S3 (arranged between the input station S1 and the feeding station S4), where the carriage 16 stops and an adhesive means (for example, one or more glue drops or a double-sided adhesive tape) designed to cause the electronic circuit 10 to stick to the article 1 is applied on each article 1 carried by the carriage 16. According to a preferred embodiment, in the application station S3 there are two redundant twin application units, which are used simultaneously or alternatively (so that an application unit can be used, while the other is standing still because it needs to be restored/subjected to maintenance/cleaned).

Subsequently, the main conveyor 15 moves a carriage 16 (carrying four seats 18) along the assembling path P and from the application station S3 to the feeding station S4 (arranged downstream of the input station S1), where the carriage 16 stops and each article 1 carried by the carriage 16 is coupled to an electronic circuit 10 provided with the two electrical contacts 12. According to a preferred embodiment, in the feeding station S4 there are two redundant twin feeding units, which are used simultaneously or alternatively (so that a feeding unit can be used, while the other is standing still because it needs to be restored/subjected to maintenance/cleaned).

Subsequently, the main conveyor 15 moves a carriage 16 (carrying four seats 18) along the assembling path P and from the feeding station S4 to one of the two winding stations S5 and S6 (arranged one after the other downstream of the feeding station S4), where the carriage 16 stops and an externally insulated conductor wire 13 is wound around each article 1 carried by the carriage 16 in order to create a series of turns making up the wound coil 11A. According to a preferred embodiment, each winding station S5 or S6 is configured to operate with two carriages 16 at a time (namely, with eight articles 1 at a time), since the winding operation is fairly slow (namely, requires time in order to be carried out with a high quality).

As better described below, according to a first embodiment, the two winding stations S5 and S6 are redundant twin stations and are used simultaneously (namely, in parallel) or alternatively (so that a winding station S5 or S6 can be used, while the other winding station S6 or S5 is standing still because it needs to be restored/subjected to maintenance/cleaned). In this case, each carriage 16 is stopped in only one of the two winding stations S5 or S6 and, hence, the corresponding coil 11A is coupled (wound) around each article 1 in the winding station S5 or, alternatively, in the winding station S6; in other words, approximately half the articles 1 receive the corresponding coil 11A in the winding station S5, whereas the remaining half of the articles 1 receive the corresponding coil 11A in the winding station S6 and, as a consequence, approximately half the carriages 16 stop in the winding station S5, whereas the remaining half of the carriages 16 stops in the winding station S6 (namely, the two winding stations S5 and S6, by operating together and in parallel, split the carriages 16 between themselves).

According to a second alternative, which is better described below, the two winding stations S5 and S6 are used in series one after the other or alternatively to one another (so that a winding station S5 or S6 can be used, while the other winding station S6 or S5 is standing still because it needs to be restored/subjected to maintenance/cleaned). In this case, each carriage 16 is stopped in both winding stations S5 or S6 or is stopped twice in the area of one single winding station S5 or S6.

Subsequently, the main conveyor 15 moves a carriage 16 (carrying four seats 18) along the assembling path P and from the winding station S5 and/or S6 to the welding station S7 (arranged downstream of the winding stations S5 and S6), where the carriage 16 stops and, in each article 1 carried by the carriage 16, the two opposite ends of the wound coil 11A are welded (for example, through ultrasound or through laser) to the two electrical contacts 12 of the electronic circuit 10. According to a preferred embodiment, the welding station S7 is configured to operate with four carriages 16 at a time (namely, with sixteen articles 1 at a time), since the welding operation is relatively slow (namely, requires time in order to be carried out with a high quality).

Subsequently, the main conveyor 15 moves a carriage 16 (carrying four seats 18) along the assembling path P and from the welding station S7 to the output station S2 (arranged downstream of the welding station S7), where the carriage 16 stops and the articles 1 carried by the carriage 16 are removed from the seats 18 so that they can leave the automatic machine 14.

According to a preferred embodiment, each seat 18 of a carriage 16 houses the article 1 in a projecting manner so that the article 1 partially protrudes out of the carriage 16 letting a part of a lower wall 3 of the article 1 (where the electronic circuit 10 with the two electrical contacts 12 has to be placed) free. In the application station S3, the adhesive means is coupled to the free part of the lower wall 3 of the article 1 from the bottom to the top; if necessary, in the application station S3 there is a countering body 24 (shown in FIG. 4), which is vertically movable and (slightly) presses against the articles 1 carried by a carriage 16 from the top to the bottom so as to counter the bottom-to-top thrust applied to the articles 1 during the application of the adhesive means. In the feeding station S4, each electronic circuit 10 is coupled to the free part of the lower wall 3 of the article 1 from the bottom to the top; in the feeding station S4 there preferably is a countering body 25 (shown in FIG. 4), which is vertically movable and (slightly) presses against the articles 1 carried by a carriage 16 from the top to the bottom so as to counter the bottom-to-top thrust applied to the articles 1 during the feeding of the electronic circuits 10.

Figure 6:
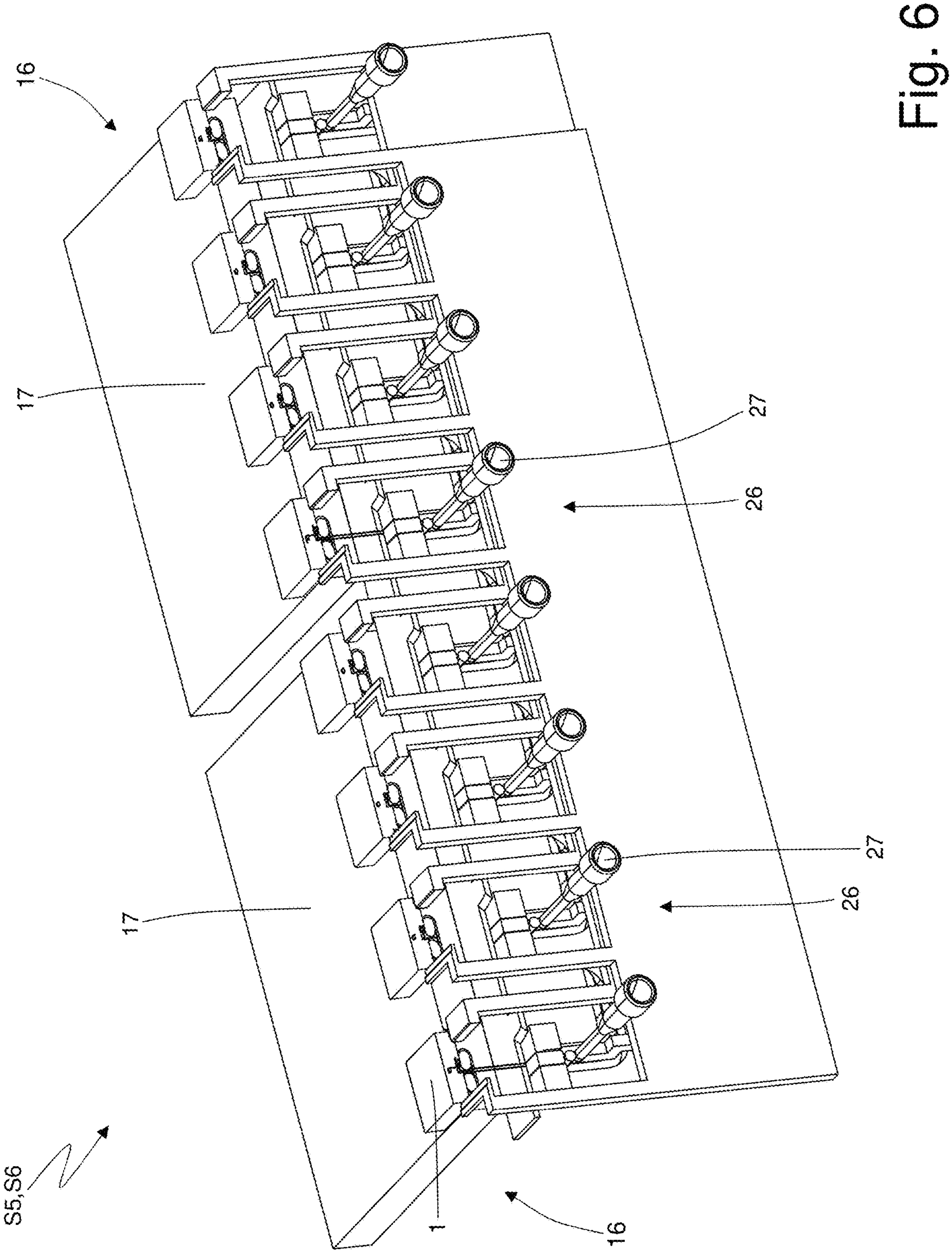
FIG. 6 is a perspective view, with parts removed for greater clarity, of a winding station of the machine of FIG. 3.

As mentioned above, each winding station S5, S6 is preferably configured to operate with two carriages 16 at a time (namely, with eight articles 1 at a time), hence, in the winding station S5, S6, eight coils 11A are simultaneously manufactured by winding eight wires 13 around eight articles 1. As shown in FIG. 6, each winding station S5 or S6 can comprise eight different positions 26, each assigned to a corresponding article 1 and allowing the respective wire 13 to be wound around the corresponding article 1; as a consequence, each winding station S5, S6 operates in parallel carrying our eight different winding operations at a time. According to other embodiments which are not shown herein, the number of positions 26 present in each winding station S5, S6 is different (generally ranging from a minimum of one to a maximum of twelve-sixteen).

Each position 26 of the winding station S5, S6 comprises a movable finger 27, which is used to move the wire 13, namely to move the wire 13 towards the article 1, around the article 1 and, then, away from the article 1. In particular, each coil 11A is obtained by directly winding the wire 13 around the article 1, having a finger 27 revolve around the article 1 with a helical (spiral) rotation movement. In other words, each coil 11A is directly manufactured around the article 1 by having the movable finger 27, which engages the wire 13 in a sliding manner, revolve several times around the article 1 with a helical rotation. Each movable finger 27 has a tubular shape having a central hole going through the movable finger 27 from side to side and accommodating the wire 13; namely, the wire 13 is inserted into a rear opening of the movable finger 27 and comes out from a front opening of the movable finger 27. For each movable finger 27, the wire 13 is progressively unwound from a reel contained in a suitable container, goes through a stretching device and, then, reaches the movable finger 27; each stretching device is configured to apply an always constant stretch to the wire 13.

Each winding unit S5, S6 comprises a common support body 28 (shown in FIG. 4), on which all eight movable fingers 27 are mounted in order to move all eight movable fingers 27 always together and with the same identical law of motion; in particular, the eight movable fingers 27 are mounted on the support body 28 in a rigid manner, namely the eight movable fingers 27 always move with the support body 28 in an integral manner and never make any kind of movement relative to the support body 28. The support body 28 is moved by one single actuator device 29 (shown in FIG. 4) provided with (at least) an independent electric motor of its own.

Figure 7:
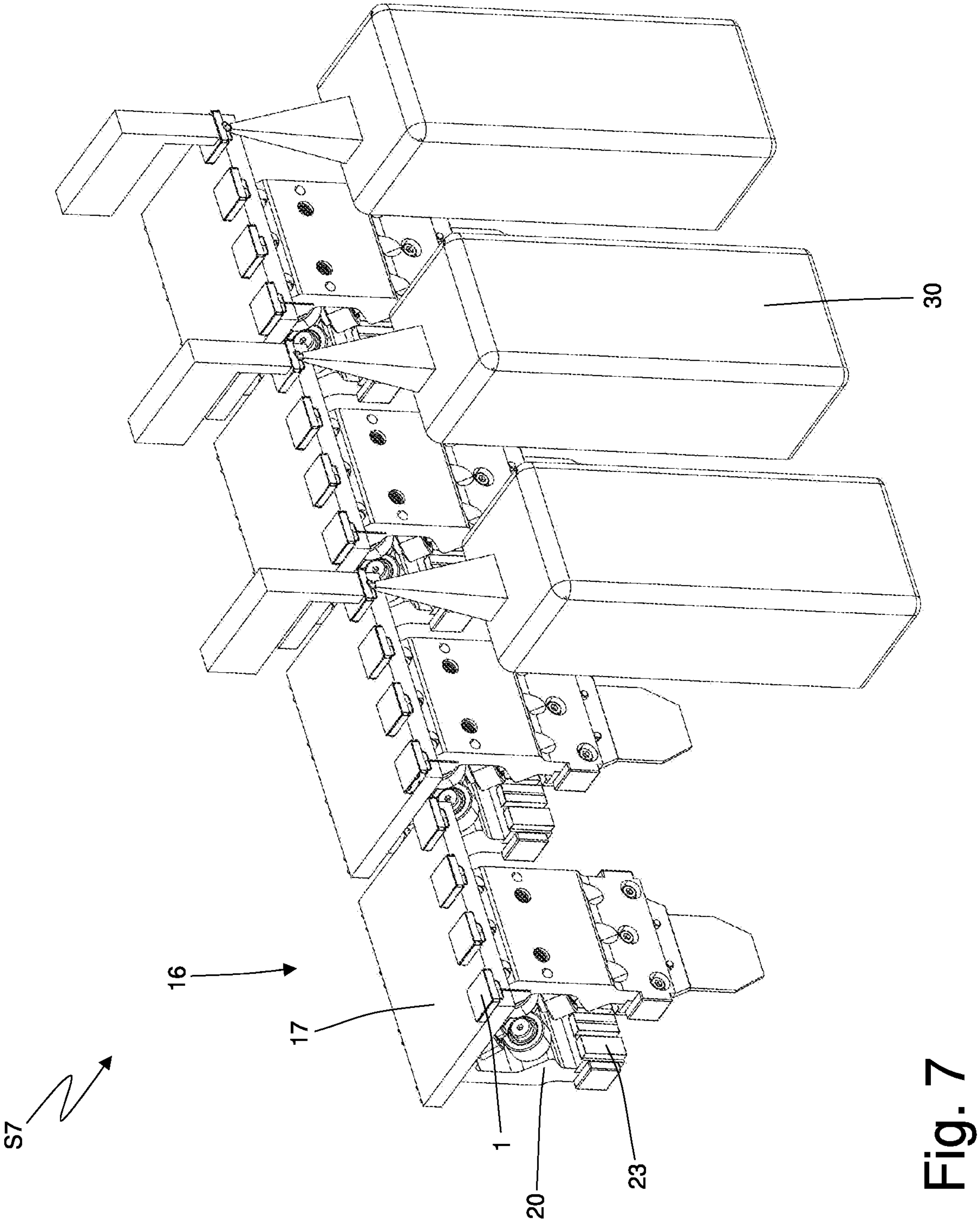
FIG. 7 is a perspective view, with parts removed for greater clarity, of a welding station of the machine of FIG. 3.

According to FIG. 7, the welding station S7 comprises four welding heads 30, each arranged in a fixed position and configured to weld the two opposite ends of the wound coil 11A to the two electrical contacts 12 of the electronic circuit 10; in use, the main conveyor 15 moves a carriage 16 so as to cause all four articles 1 carried by the carriage 16 to reach, one after the other, the area of a corresponding welding head 42.

Each welding head 42 also is preferably configured to cut the two opposite ends of the wound coil 11A downstream of the welds to the two electrical contacts 12 of the electronic circuit 10, so as to remove the excess part of the two opposite ends of the wound coil 11A.

The automatic machine 14 comprises a control unit 31 (schematically shown in FIG. 3), which controls the operation of the entire automatic machine 14.

The operation of the automatic machine 14 will be described below, with special reference to the peculiar control modes of the winding stations S5 and S6.

The control unit 31 cyclically and continuously monitors the functionality of all components of the automatic machine 14 and, in particular, the functionality of the two winding stations S5 and S6 (which are the components of the automatic machine 14 most frequently subjected to problems) in order to determine whether the winding stations S5 and S6 are capable of operating or not; in particular, the main drawback (problem) that can arise in a winding station S5 or S6 is the breaking of the wire 13 in (at least) a position 26, since, in case the wire 13 breaks in a position 26, the position 26 can no longer be used until the continuity of the wire 13 is restored. One of the main indicators that can be used to diagnose the breaking of a wire 13 is the extent of the stretch of the wire 13: when the stretch of a wire 13 is zero (namely, is below a minimum threshold), the breaking of the wire 13 is basically certain.

As mentioned above, each winding station S5, S6 has a plurality of (in particular, eight) positions 26, which operate in parallel; hence, if (at least) one of the work positions 26 is not operating, namely is standing still (for example due to the breaking of the wire 13 or because of a scheduled or non-scheduled maintenance intervention), the winding station S5, S6 could continue operating using the sole positions 26 still working (namely, excluding the non-working position 26); obviously, the seat 18 of a carriage 16 standing in the area of a non-working position 26 has to be left out of production by not feeding a corresponding article 1 in the input station S1, by not applying the adhesive in the application station S3, by not feeding a corresponding electronic circuit 10 in the feeding station S4 and by not carrying out the welding operation in the welding station S7.

However, using a winding station S5 or S6 with one (or more) non-working positions 26 is a makeshift solution, which is generally used by the control unit 31 of the automatic machine 14 only when necessary and only for relatively "short" amounts of time, since it is anyway a solution that jeopardizes productivity (using only seven positions 26 instead of all eight positions 26 reduces productivity by 12.5%) and stresses the entire automatic machine 14 (since it cyclically has to disable, for a work cycle, all parts of the automatic machine 14 involved in the processing of an article 1 that would be assigned to the non-working position 26).

According to the first embodiment of the invention, when both winding stations S5 and S6 are (fully) operating (namely, when, in both winding stations S5 and S6, all the corresponding positions 26 are working), the preferred operating mode chosen by the control unit 31 of the automatic machine 14 entails using the two winding stations S5 and S6 together and in parallel, having each winding station S5 or S6 operate at a production speed (measured as number of pieces processed per time unit by the station S5 or S6) which is equal to half the production speed (measured as number of pieces processed per time unit) of the automatic machine 14. In other words, the control unit 31 uses, when they are both (fully) operating, the two winding stations S5 and S6 together and in parallel, having each winding station S5, S6 operate at half the production speed (measured as number of pieces processed per time unit) of the automatic machine 14, so that half the coils 11A are manufactured by the winding station S5 and the other half of the coils 11A is manufactured by the winding station S6.

By way of example, if, at a given time, the production speed of the automatic machine 14 is 480 articles (pieces) per minute, each winding station S5, S6 is caused to operate at a production speed of 240 articles (pieces) per minute and the sum of the two winding stations S5, S6 fulfils the need of the automatic machine 14, which, as a whole, operates at 480 articles (pieces) per minute. In other words, the stations S1-S4 and S7 of the automatic machine 14 have to each operate at 480 articles (pieces) per minute, whereas the winding stations S5, S6 of the automatic machine 14 have to each operate at 240 articles (pieces) per minute, since there are two of them performing the same task and, hence, splitting the coils 11A to be manufactured into two halves. It should be pointed out that, when a winding station S5, S6 operates at 240 articles (pieces) per minute, each position 26 of the winding station S5, S6 operates at 30 articles (pieces) per minute (since in each winding station S5 or S6 there are eight positions 26).

According to this first embodiment, when one of the winding stations S5 and S6 is not (fully) operating (namely, when in one of the winding stations S5 and S6 there is at least one non-working position 26 or when one of the winding stations S5 and S6 is completely not working, for example due to a scheduled or non-scheduled maintenance intervention), the preferred operating mode chosen by the control unit 31 of the automatic machine 14 entails using only the other working winding station S6 or S5, which is caused to operate at a production speed (measured as number of pieces processed per time unit by the station S5 or S6) which is equal to a production speed (measured as number of pieces processed per time unit) of the automatic machine 14. In other words, the control unit 31 uses, when a winding station S5 or S6 is not (entirely) operating, only the other operating winding station S6 or S5, which is caused to operate at a production speed (measured as number of pieces processed per time unit) which is equal to the production speed of the automatic machine 14 (measured as number of pieces processed per time unit), so that all coils 11A are manufactured in the only operating winding station S6 or S5.

By way of example, if, at a given time, the production speed of the automatic machine 14 is 480 articles (pieces) per minute, the sole winding station S5, S6 being used is caused to operate at a production speed of 480 articles (pieces) per minute, just like the other stations S1-S4 and S7 of the automatic machine 14 have to each operate at 480 articles (pieces) per minute.

According to a preferred embodiment, each winding station S5, S6 is capable of operating at a nominal production speed (namely, a maximum production speed measured as number of pieces processed per time unit) which is higher than half a nominal production speed (namely, a maximum production speed measured as number of pieces processed per time unit) of the automatic machine 14 and, in particular, each winding station S5 or S6 is capable of operating at a nominal production speed (namely, a maximum production speed measured as number of pieces processed per time unit) which is equal to a nominal production speed (namely, a maximum production speed measured as number of pieces processed per time unit) of the automatic machine 14. Namely, each winding station S5, S6 is capable of reaching a nominal production speed (namely, a maximum production speed measured as number of pieces processed per time unit) which is equal to a nominal production speed (namely, a maximum production speed measured as number of pieces processed per time unit) of the automatic machine 14 and, hence, each winding station S5 or S6 is capable, alone (i.e. without any help from the other winding station S6 or S5), of fulfilling the production needs of the automatic machine 14, even when the automatic machine 14 reaches its nominal production speed (namely, a maximum production speed measured as number of pieces processed per time unit). Therefore, the two winding stations S5 and S6 are completely redundant relative to one another, since there are to winding stations S5 and S6 dedicated to the same identical function and each capable of fulfilling, alone, the production needs of the automatic machine 14, even when the automatic machine 14 reaches its nominal production speed (namely, a maximum production speed measured as number of pieces processed per time unit); hence, the two winding stations S5 and S6 are organized so that a problem affecting only one of them cannot determine a general malfunction of the entire automatic machine 14 (even when the automatic machine 14 reaches its nominal production speed).

Always using both winding stations S5 and S6 (obviously, when they are both working) allows each winding station S5 or S6 to operate at an actual production speed (measured as number of pieces processed per time unit) which, worst case scenario, is half its own nominal production speed (namely, maximum production speed measured as number of pieces processed per time unit). Hence, always using both winding stations S5 and S6 (obviously, when they are both working) allows each winding station S5 or S6 to operate in a very slow manner (compared to what could be reached by operating at its own nominal production speed) and, therefore, significantly reduces those accelerations (namely, forces) to which all materials (and, especially, the wire 13) are subjected during the winding, thus significantly reducing the risk of undesired breaking of the wire 13.

In other words, using both winding stations S5 and S6 (obviously, when they are both working) at a “half speed” rather than one single winding station S5 or S6 at a “full speed” does not affect the overall productivity of the two winding stations S5 and S6 (in any case, the number of pieces produced per time unit is the same), but, on the contrary, it very positively affects the risk of undesired breaking of the wire 13, namely significantly reduces the risk of undesired breaking of the wore 13. Therefore, the control unit 31 always prefers the operating mode in which both winding stations S5 and S6 (obviously, when they are both working) are used at a “half speed” rather than the operating mode in which one single winding station S5 or S6 is used at a “full speed”.

As a consequence, when they are both working, the two winding stations S5 and S6 are used together and in parallel having each winding station S5, S6 operate at an actual production speed (measured as number of pieces processed per time unit) which always is smaller than its own nominal production speed (namely, maximum production speed measured as number of pieces processed per time unit), even when the automatic machine 14 operates at its own nominal production speed (namely, maximum production speed measured as number of pieces processed per time unit). Furthermore, each winding station S5 or S6 is caused to operate at its own nominal production speed (namely, maximum production speed measured as number of pieces processed per time unit) only when it is the only working winding station S5 or S6, for the other winding station S6 or S5 is not working.

When, in a winding station S5 or S6, a wire 13 breaks, the control unit 31 can decide not to use the winding station S5 or S6 not (completely) operating and, hence, to only use the other winding station S6 or S5 completely operating (at twice the speed than before). However, the control unit 31 can also decide to continue using both winding stations S5 and S6, accepting that the winding station S5 or S6 not (completely) working operates without the position 26 where the wire 13 broke and, hence, operates with a reduced productivity; this choice is made because giving up a moderate amount of product ivy, having both winding stations S5 and S6 operate at a “half speed”, could be better than using one single winding station S5 or S6 at a “full speed” (with a greater risk of breaking wires 13 in the sole winding station S5 or S6 operating at a “full speed”). In these conditions, the smaller productivity of the winding station S5 or S6 not (completely) working (namely, of the winding station S5 or S6 with a non-working position 26) could be balanced by slightly increasing the production speed of the winding station S5 or S6 not (completely) working, by slightly increasing the production speed of the completely working winding station S6 or S5 or by slightly increasing the production speed of both winding stations S5 and S6; however, it should be pointed out that the control unit 31 is not completely free to have the two winding station S5 and S6 operate at any production speed, since the operation of the two winding stations S5 and S6 is anyway forced to respect times and synchronisms set by all the other stations S1-S4 and S7 of the automatic machine 14.

Generally speaking, the choice made by the control unit 31 can change over time and is based on an analysis (also carried out in a remote manner by the manufacturer of the automatic machine 14) of historic data, which allows for an identification, in all conditions, of the ideal choice (namely, the choice that does not maximize the instantaneous productivity, but maximizes the average productivity over time).

When, in a winding station S5 or S6, a wire 13 breaks, an operators needs to intervene in order to restore the broken wire 13; obviously, during the operations carried out to restore a broken wire 13 in a winding station S5 or S6, the winding station S5 or S6 needs to be completely still and, therefore, during the operations carried out to restore a broken wire 13 in a winding station S5 or S6, there is no other choice but to only have the other winding station S6 or S5 be used by the automatic machine 14 for normal production.

According to a preferred embodiment, each winding station S5, S6 is provided with protection elements PE, which isolate the winding station S5, S6 from all other moving parts of the automatic machine 14 and, hence, allow an operator to act upon the winding station S5 or S6 standing still while the rest of the automatic machine 14 is working. By so doing, maintenance operations (such as restoring a broken wire 13) can be carried out even when the automatic machine 14 is regularly operating. According to a possible embodiment, in each winding station S5, S6, at least one protection element PE is movable is and moved (typically, by a servomotor) between a deactivated position, which does not (mechanically, physically) isolate the corresponding winding station S5 or S6 and is assumed only when the corresponding winding station S5 or S6 is working, and an active position, which (mechanically, physically) isolates the corresponding winding station S5 or S6 and is assumed only when the corresponding winding station S5 or S6 is not working, namely is standing still, and has to be subjected to a maintenance intervention by an operator.

In the preferred embodiment described above, each winding station S5, S6 is capable of operating at a nominal production speed (namely, a maximum speed measured as number of pieces processed per time unit) which is equal to a nominal production speed of the automatic machine 14 (measured as number of pieces processed per time unit). According to a different embodiment, each winding station S5, S6 is capable of operating (namely, is configured to operate) at a nominal production speed (namely, a maximum speed measured as number of pieces processed per time unit) which ranges from 30% to 120%, preferably from 50% to 120% of the nominal production speed of the automatic machine 14 (measured as number of pieces processed per time unit). For example, each winding station S5 or S6 is capable of operating at a nominal production speed (namely, a maximum speed measured as number of pieces processed per time unit) which is equal to 75% of the nominal production speed of the automatic machine 14 (measured as number of pieces processed per time unit); this embodiment is a compromise between cost needs (the higher the nominal production speed of a winding station S5 or S6, the higher the cost of the winding station S5 or S6) and the need to maintain a high productivity in the long run (when a winding station S5 or S6 is not working, the automatic machine 14 cannot reach its nominal production speed, but, on the other hand, a winding station S5 or S6 is completely out of order only for a limited amount of time compared to the possible twenty-four hours of continuous operation of the automatic machine 14).

In the non-limiting embodiment shown in the accompanying figures, the automatic machine 14 comprises two redundant winding stations S5 and S6, which normally operate in parallel at a “half speed” and, only when one single winding station S5 or S6 is not working (and, hence, stands still), the other winding station S5 or S6 operates alone at a “full speed”. According to other embodiments, the automatic machine 14 comprises N redundant winding stations (wherein N is an integer number greater than two, for example three four or five), which normally operate in parallel, each at a production speed that is an N-th of the production speed of the automatic machine 14; when a winding station stops working, the other winding stations still working increase their production speed accordingly. For example, in case of three winding stations, each winding station has a production speed equal to 33% of the production speed of the automatic machine 14 when all three winding stations are working, each working winding station has a production speed equal to 50% of the production speed of the automatic machine 14 when only two winding stations are working, and the sole remaining winding station has a production speed equal to 100% of the production speed of the automatic machine 14 when one single winding station is working.

To sum up, the control unit 31 is configured to use, when they are both working, the two winding stations S5 and S6 together and in parallel, having each winding station S5 and S6 operate at a corresponding first production speed, and to use, when a winding station S5 or S6 is not working, only the other winding station S6 or S5, which is caused to operate at a second production speed, which is higher than the corresponding first production speed (assuming that the operating speed of the automatic machine 14 remains the same), so as to at least partially make up for the lack of operation of a winding station S5 or S6. Namely, the sum of the first production speeds (of both winding stations S5 and S6 working in parallel) is equal to a production speed of the automatic machine 14 and the second production speed (of the sole working winding station S5 or S6) is equal to the production speed of the automatic machine 14. Each winding station S5 and S6 has a nominal production speed which is higher than a nominal production speed of the automatic machine 14 divided by the total number of winding stations S5 and S6 and, preferably, each winding station S5 and S6 has a nominal production speed which is equal to a nominal production speed of the automatic machine 14.

More in general, when they all work, all winding stations S5 and S6 are used together and in parallel, having each winding station S5 and S6 operate at the first speed, so that the sum of all first production speeds is equal to a production speed of the automatic machine 14; on the other hand, when a winding station S5 or S6 is not working, only the other working stations S6 or S5 are used, each of them being caused to operate at the second production speed, so that the sum of all second production speeds is equal to a production speed of the automatic machine 14. Furthermore, each winding station S5 and S6 has a nominal production speed which is higher than a nominal production speed of the automatic machine 14 divided by the total number of winding stations S5 and S6.

As mentioned above, the coupling of a wire 13 to an article 1 carried by the respective carriage 16 can take place in only one of the two winding stations S5 or S6 operating in parallel (namely, in case one single coil 11A has to be manufactured around the article 1) or, according to a second embodiment, in both winding stations S5 and S6 (namely, in case at least one of first coil 11A and one second coil 11B have to be manufactured around the article 1).

In the second embodiment, the carriage 16 stops in both stations S5 and S6, if they are both working; in this case, if they are both working, the winding stations S5 and S6 operate in series and are arranged consecutive to one another along the processing path P. In this case, when a winding station S5, S6 is not working, the other winding station S6, S5 is configured to couple the wire 13 around the article 1 carried by the carriage 16 in order to manufacture both the corresponding first coil 11A and the corresponding second coil 11B, thus serving as the non-working winding station S5, S6 (namely, replacing the non-working winding station S5, S6). The first coil 11A and the second coil 11B are manufactured in two different position of the article 1, for example in the area of two different walls 2, 3, 4, 5, 6 (faces) of the article 1 (see FIGS. 3, 4, by way of example).

Therefore, in this case, if they are both (fully) working, the winding stations S5 and S6 each operate at a first production speed which is equal to the production speed of the automatic machine 14.

In this case, each winding station S5, S6 is capable of operating (namely, is configured to operate) at a nominal production speed which is even higher than the nominal production speed of the automatic machine 14, for example is capable of operating a nominal production speed ranging from 100% to 180% of the nominal production speed of the automatic machine 14 (measured as number of pieces processed per time unit). Hence, if one of the two winding stations S5 or S6 is not working, the working winding station S6, S5 can increase the relative nominal speed so as to at least partially make up for the lack of operation of the other winding station S5, S6.

According to the embodiment described above, there can be provided the further step of changing the orientation of the article 1 relative to the carriage 16 in a handling station S8 (shown in FIG. 9) arranged along the processing path between the winding station S5 and the winding station S6, preferably downstream of a welding station S7. In case a winding station S5, S6 is not working, the carriage 16 can be moved to the working winding station S5, S6 in order to manufacture the first coil 11A; then, after having manufactured the first coil 11A, the carriage 16 can be moved from the winding station S5, S6 to the handling station S8 in order to change the orientation of the article 1 relative to the carriage 16 (as shown in FIG. 10). After having changed the orientation, the carriage 16 can be moved back from the handling station S8 to the working winding station S5, S6 in order to create the second coil 11B.

In this case, the carriage 16 can comprise at least two different seats 18 beside one another, each designed to accommodate the article 1 with a different orientation. In the handling station S8, the component can preferably be rotated by 90° (shown in dashed lines in FIG. 10) or 180°. Furthermore, in the handling station S8, the component can be moved form a first seat to a second seat of the carriage 16.

The two embodiments, namely the first and the second embodiments, described in detail above are two alternative solutions to the same technical problem and are each suited for a particular layout of the automatic machine (namely, one with the two stations S5, S6 configured to operate in parallel and the other with the two stations S5, S6 configured to operate in series).

Figure 8:
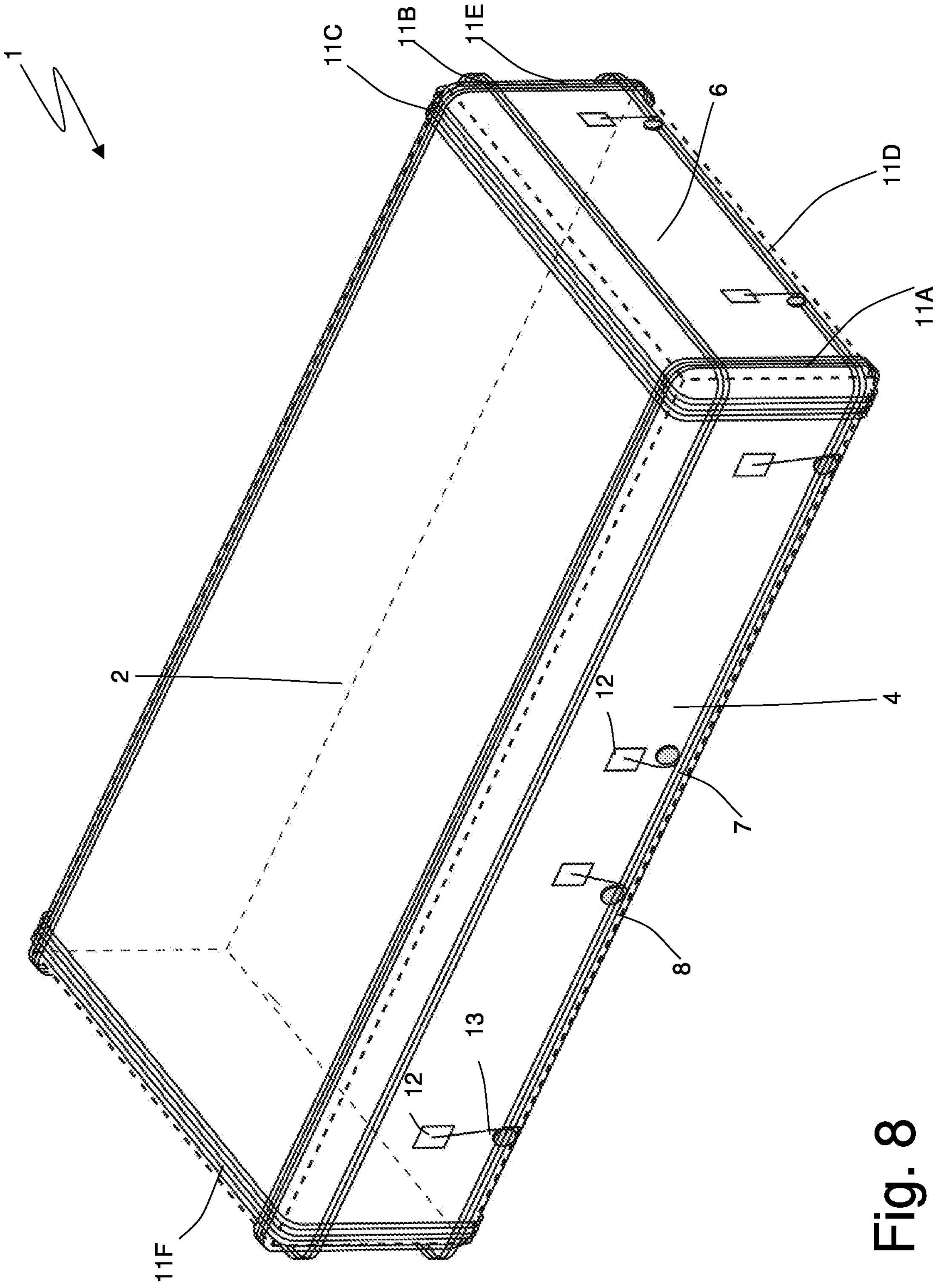
FIG. 8 is a perspective view of a component of a disposable cartridge of an electronic cigarette other than the one of FIGS. 1 and 2.

FIG. 8 shows an article 1 where there are six coils 11A-11F, one for each wall of the article 1. Therefore, in this case, the conductor wire 13 is wound around all walls of the article 1, whereas the electronic circuit can be integrated inside the article 1 and, hence, is not visible in FIG. 8.

Figure 9:
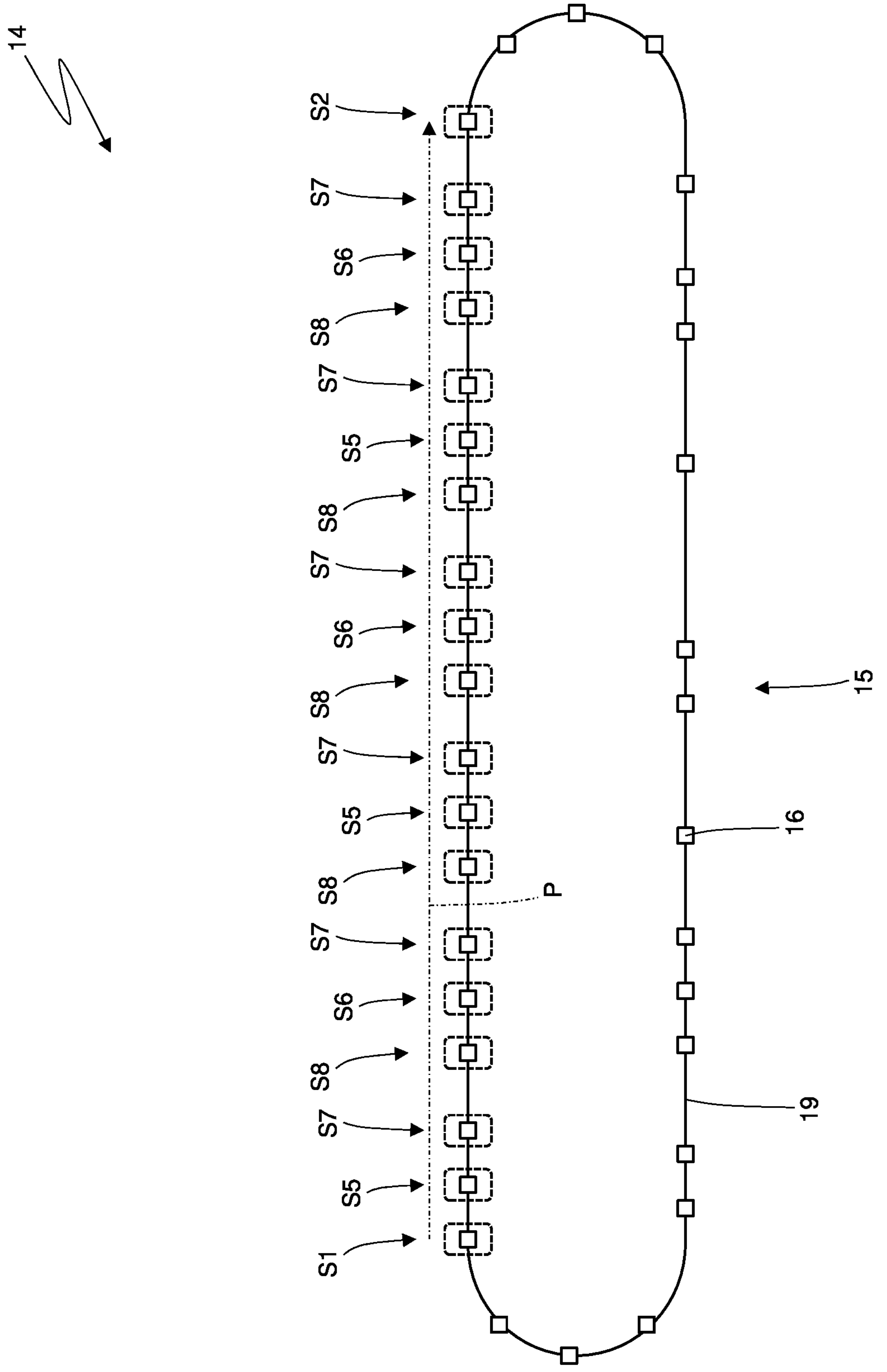
FIG. 9 is a schematic view of a machine producing the component of FIG. 8 and manufactured according to the invention.
Figure 10:
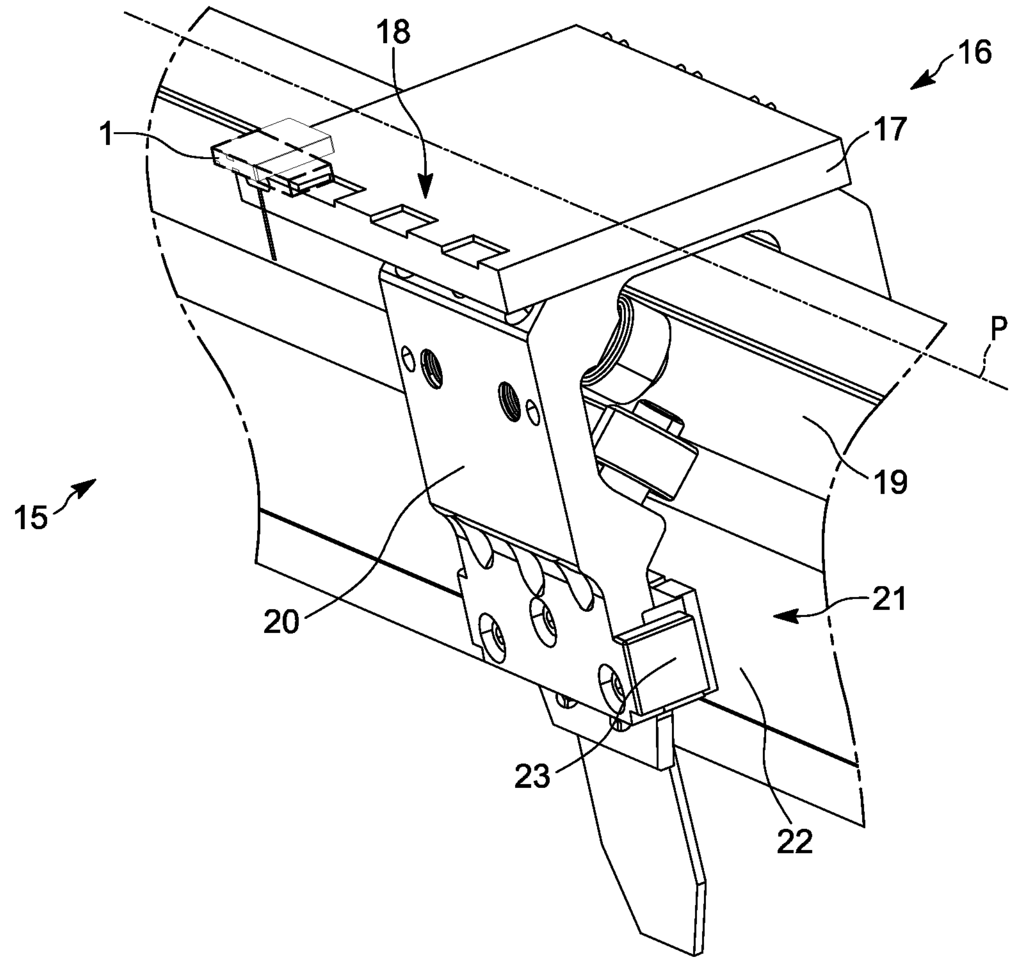
FIG. 10 is similar to FIG. 5 but shows the component of the disposable cartridge of the electronic cigarette being changed to a different orientation relative to the carriage via a handling station of the machine of FIG. 3.

FIG. 9 shows a machine 14 to manufacture the article 1 of FIG. 8, according to the second embodiment described above. Compared to FIG. 3, there are not the application station S3 and the feeding station S4 (since, as mentioned above, said circuit can be integrated in the article 1) and there is the handling station S8 between the two winding stations S5, S6 downstream of the welding station S7. Since the article 1 of FIG. 8 comprises six coils 11A-11F, FIG. 9 shows six winding stations S5, S6 spaced apart from one another by respective welding and handling stations S7, S8.

In the embodiment shown in the accompanying figures, the wire 13 is an electrically conductor wire, is externally insulated and is wound so as to form a coil 11A, 11B, which creates a wound antenna for electromagnetic interactions that can be aimed at exchanging (transmitting) information or can be aimed at generating power through electromagnetic induction. According to a different embodiment, the wire 13 is an electrically conductor wire (and, hence, an electric current can flow through it, even though it has a low or very low intensity), but has a textile core (for example, made of cotton), which is caused to become a conductor, for instance through a doping with metal nanoparticles. According to a further embodiment, the wire 13 is not an electrically conductor wire, is of the textile kind and the coil 11A, 11B creates a wick (or the like) for an electronic cigarette.

The embodiments described herein can be combined with one another, without for this reason going beyond the scope of protection of the invention.

In the non-limiting embodiment described above, the article 1 is part of a disposable cartridge of an electronic cigarette, but the method to manufacture the coil 11A, 11B, 11C, 11D, 11E, 11F described above can also be applied to the production of articles of any kind (namely, of any product class). For example, the method to manufacture the coil 11A, 11B, 11C, 11D, 11E, 11F described above can be applied to the production of articles for a machine, a plant, a construction, a product (for example, a payment means) for instance, but not exclusively, of the tobacco, pharmaceutical, food-related or entertainment industry; more in general, the method to manufacture the coil 11A, 11B, 11C, 11D, 11E, 11F described above can be applied to the production of articles for applications of any type.

The embodiments described herein can be combined with one another, without for this reason going beyond the scope of protection of the invention.

The method to manufacture the coil 11A, 11B, 11C, 11D, 11E, 11F described above has many advantages.

First of all, the method to manufacture the coil 11A, 11B, 11C, 11D, 11E, 11F described above reaches and maintains a high productivity (measured as number of articles produced per time unit) even in the long run.

The method to manufacture the coil 11A, 11B, 11C, 11D, 11E, 11F described above operates at a high production speed (measured as number of articles produced per time unit).

The method to manufacture the coil 11A, 11B, 11C, 11D, 11E, 11F described above maintains a high productive quality (generally measured as percentage of faulty articles).

The method to manufacture the coil 11A, 11B, 11C, 11D, 11E, 11F described above is relatively simple and economic to be implemented.

The method to manufacture the coil 11A, 11B, 11C, 11D, 11E, 11F described above prevents the wire 13 from frequently breaking during the winding of the wire 13.

LIST OF THE REFERENCE NUMBERS OF THE FIGS

1 article
2 upper wall
3 lower wall
4 front wall
5 rear wall
6 side walls
7 pin
8 pin
9 transponder
10 electronic circuit
11A-11F coil
12 electrical contacts
13 wire

14 automatic machine
15 main conveyor
16 carriages
17 support plate
18 seats
19 annular guide
20 slides
21 linear electric motor
22 annular stator
23 movable slider
24 countering body
25 countering body
26 positions
27 movable finger
28 support body
29 actuator device
30 welding heads
31 control unit
P building path
S1 input station
S2 output station
S3 application station
S4 feeding station
S5 winding station
S6 winding station
S7 welding station
S8 handling station

The invention claimed is:

1. A method to manufacture one or more coils (11A, 11B, 11C, 11D, 11E, 11F) around respective articles (1) using an automatic machine (14) and comprising the steps of:
- moving, by means of a main conveyor (19) and along a processing path (P), a plurality of carriages (16), each provided with at least one seat (18) designed to house an article (1);
- placing, in an input station (S1) arranged along the processing path (P), each article (1) in the at least one seat (18) of a corresponding carriage (16);
- coupling, in at least one of two winding stations (S5, S6) arranged one after the other along the path (P), a wire (13) around an article (1) carried by a carriage (16) so as to create a corresponding coil (11A, 11B, 11C, 11D, 11E, 11F);
- using, when they are both working, the two winding stations (S5, S6) together and in parallel, having each winding station (S5, S6) operate at a corresponding first production speed; and
- using, when a winding station (S5, S6) is not working, only the other winding station (S6, S5), which is caused to operate at a second production speed, which is higher than the corresponding first production speed.

2. The method according to claim 1, wherein the sum of the first production speeds is equal to a production speed of the automatic machine (14) and the second production speed is equal to the production speed of the automatic machine (14).

3. The method according to claim 1, wherein each winding station (S5, S6) has a maximum production speed which is higher than a maximum production speed of the automatic machine (14) divided by the total number of winding stations (S5, S6).

4. The method according to claim 1, wherein each winding station (S5, S6) has a maximum production speed which is equal to a maximum production speed of the automatic machine (14).

5. The method according to claim 1, wherein, when they are both working, the two winding stations (S5, S6) are used together and in parallel, having each winding station (S5, S6) operate at a production speed which always is lower than its own maximum production speed, even when the automatic machine (14) operates at its maximum production speed.

6. The method according to claim 1, wherein each winding station (S5, S6) is caused to operate at its own maximum production speed only when it is the only working winding station (S5, S6).

7. The method according to claim 1, wherein each winding station (S5, S6) is provided with protection elements, which isolate the winding station (S5, S6) from all other moving parts of the automatic machine (14).

8. The method according to claim 7, wherein at least one protection element is movable and is moved between a deactivated position, which does not isolate the corresponding winding station (S5, S6) and is assumed only when the corresponding winding station (S5, S6) is working, and an active position, which isolates the corresponding winding station (S5, S6) and is assumed only when the corresponding winding station (S5, S6) is not working.

9. The method according to claim 1, wherein each carriage (16) is caused to stop in the at least one of two winding stations (S5, S6) for an amount of time needed to couple the wire (13) around a corresponding article (1) carried by a carriage (16).

10. The method is according to claim 1, wherein the wire (13) is directly wound around each article (1) by a movable finger (27) that slidably engages the wire (13).

11. The method according to claim 1 and comprising the further step of welding, in a welding station (S7) arranged along the processing path (P) downstream of the winding stations (S5, S6), two ends of each coil (11A, 11B, 11C, 11D, 11E, 11F) to two electrical contacts (12) present in the article (1).

12. The method according to claim 1, wherein each winding station (S5, S6) operates in parallel, coupling, at the same time, several coils (11A, 11B, 11C, 11D, 11E, 11F) around respective articles (1) carried by one or more carriages (16).

13. The method according to claim 1, wherein the main conveyor (15) comprises:
- an annular guide (19);
- a slide (20), which is coupled to the annular guide (19) so as to freely slide along the annular guide (19) and supports the carriage (15); and
- a linear electric motor (21), which moves the slide (20) and is provided with an annular stator (22), which is arranged in a fixed position along the annular guide (19), and with a movable slider (23), which is electromagnetically coupled to the annular stator (22) so as to receive, from the annular stator (22), a driving force and is rigidly connected to the slide (20).

14. A method to manufacture at least two different coils (11A, 11B, 11C, 11D, 11E, 11F) around respective articles (1) using an automatic machine (14); the method comprises the steps of:
- moving, by means of a main conveyor (19) and along a processing path (P), a plurality of carriages (16), each provided with at least one seat (18) designed to house an article (1);
- placing, in an input station (S1) arranged along the processing path (P), each article (1) in the at least one seat (18) of a corresponding carriage (16);

coupling, in a first winding station (S5) arranged along the processing path (P), a wire (13) around each article (1) carried by a carriage (16) so as to create a corresponding first coil (11A);

coupling, in a second winding station (S6) arranged along the processing path (P) downstream of the first winding station (S5), a wire (13) around each article (1) carried by a carriage (16) so as to create a corresponding second coil (11B); and changing the orientation of the article (1) relative to the carriage (16) in a handling station (S8) arranged along the processing path (P) between the first winding station (S5) and the second winding station (S6);

wherein, in case a winding station (S5, S6) does not work, the other winding station (S6, S5) is configured to couple a wire (13) around each article (1) carried by [a] the carriage (16) so as to create both a corresponding first coil (11A) and a corresponding second coil (11B), taking the place of the winding station (S5, S6) that is not working.

15. The method according to claim 14 and comprising, in case a winding station (S5, S6) does not work, the further steps of:

moving each carriage (16) to the working winding station (S5, S6) in order to create a coil (11A, 11B, 11C, 11D, 11E, 11F);

after the creation of a coil (11A, 11B), moving each carriage (16) from the working winding station (S5, S6) to the handling station (S8) in order to change the orientation of the article (1) relative to the carriage (16); and after having changed the orientation, moving each carriage (16) back from the handling station (S8) to the working winding station (S5, S6) in order to create the other coil (11A, 11B).

16. An automatic machine (14) to manufacture one or more coils (11A, 11B, 11C, 11D, 11E, 11F) around respective articles (1) and comprising:

a main conveyor (19), which is configured to move, along a processing path (P), a plurality of carriages (16), each provided with at least one seat (18) designed to house an article (1);

an input station (S1), which is arranged along the processing path (P) and is configured to place each article (1) in the at least one seat (18) of a corresponding carriage (16);

at least one first winding station (S5) and at least one second winding station (S6), which are arranged one after the other along the path (P) and are each configured to couple a wire (13) around an article (1) carried by a carriage (16) so as to create a corresponding coil (11A, 11B, 11C, 11D, 11E, 11F); and a control unit (31), which is configured to:

use, when they are both working, the two winding stations (S5, S6) together and in parallel, having each winding station (S5, S6) operate at a corresponding first production speed; and use, when a winding station (S5, S6) is not working, only the other winding station (S6, S5), which is caused to operate at a second production speed, which is higher than the corresponding first production speed.

17. An automatic machine (14) to manufacture one or more coils (11A, 11B, 11C, 11D, 11E, 11F) around respective articles (1) and comprising:

a main conveyor (19), which is configured to move, along a processing path (P), a plurality of carriages (16), each provided with at least one seat (18) designed to house an article (1);

an input station (S1), which is arranged along the processing path (P) and is configured to place each article (1) in the at least one seat (18) of a corresponding carriage (16);

at least one first winding station (S5) and at least one second winding station (S7), which are arranged one after the other along the path (P) and are each configured to couple a wire (13) around an article (1) carried by a carriage (16) so as to create a corresponding coil (11A, 11B, 11C, 11D, 11E, 11F); and a control unit (31), which is configured to use, when they all work, all winding stations (S5, S6) together and in parallel, having each winding station (S5, S6) operate at a first production speed, so that the sum of all first production speeds is equal to a production speed of the automatic machine (14);

wherein the control unit (31) is configured to use, when a winding station (S5, S6) does not work, only the other working winding stations (S5, S6), each of them being caused to operate at a second production speed, so that the sum of all second production speeds is equal to a production speed of the automatic machine (14); and wherein each winding station (S5, S6) has a maximum production speed which is higher than a maximum production speed of the automatic machine (14) divided by the total number of winding stations (S5, S6).

* * * * *